(12) United States Patent
Miyasaka

(10) Patent No.: US 7,651,727 B2
(45) Date of Patent: Jan. 26, 2010

(54) METHOD FOR SURFACE TREATMENT OF SLIDING PORTION

(75) Inventor: Yoshio Miyasaka, Nagoya (JP)

(73) Assignee: Fuji Kihan Co., Ltd., Aichi (JP)

( * ) Notice: Subject to any disclaimer, the term of this patent is extended or adjusted under 35 U.S.C. 154(b) by 481 days.

(21) Appl. No.: 11/208,587

(22) Filed: Aug. 23, 2005

(65) Prior Publication Data
US 2006/0275543 A1 Dec. 7, 2006

(30) Foreign Application Priority Data
Jun. 7, 2005 (JP) .............................. 2005-167477

(51) Int. Cl.
*B05D 1/12* (2006.01)
(52) U.S. Cl. ....................... 427/201; 427/275
(58) Field of Classification Search ................... 427/201
See application file for complete search history.

(56) References Cited

U.S. PATENT DOCUMENTS 6,863,922 B2 * 3/2005 Ogihara et al. .............. 427/190

FOREIGN PATENT DOCUMENTS

| JP | 11-13157 | | 5/1999 |
|---|---|---|---|
| JP | 11-131257 | * | 5/1999 |
| JP | 2000-28259 | | 10/2000 |
| JP | 2002-161371 | | 6/2002 |

OTHER PUBLICATIONS

Encyclopedia of Materials Science and Engineering, vol. 7, pp. 5539, 5070; 1986.*

* cited by examiner

*Primary Examiner*—Frederick J Parker
(74) *Attorney, Agent, or Firm*—Shlesinger, Arkwright & Garvey LLP

(57) ABSTRACT

There is provided a method for surface treatment of a sliding portion of a product, which is an economical method, has less risk of polluting the working environment, or causing a fire by the powder dust, and yet enables high lubricativeness to be achieved, and many concavities to be formed on the sliding portion while simultaneously providing lubricativeness. Injection particles, obtained by blending soft-metal solid lubricant particles the surfaces of which have been oxidized and layered-structure solid lubricant particles, are injected onto a surface of the sliding portion of the product to be treated at an injection speed of 150 m/sec or more, thereby to diffuse and penetrate the surface to form a layer of the injection particles, and to form many concavities on the surface of the sliding portion.

12 Claims, 5 Drawing Sheets

Treatment Object: Aluminum Plate

Untreated Article  Embodiment 1-1  Embodiment 1-2

Treatment Object: Stainless Plate

Untreated Article  Embodiment 2-1  Embodiment 2-2

Treatment Object: Titanium Plate

Untreated Article

Embodiment 3-1

Embodiment 3-2

Treatment Object: Aluminium Plate

Untreated Article

Comparative Example 1

Treatment Object: Stainless Plate

Untreated Article　　　Comparative Example 2

Treatment Object: Titanium Plate

Untreated Article　　　Comparative Example 3

Treatment Object: Glass Plate

Untreated Article

Glass Plate Treated As It Is

Glass Plate Treated After Blasting

Treatment Object: Glass Plate

Untreated Article

Glass Plate Onto Which Only Molybdenum Disulfide Was Injected

METHOD FOR SURFACE TREATMENT OF SLIDING PORTION

BACKGROUND OF THE INVENTION

1. Field of the Invention

The present invention relates to a method for surface treatment of a sliding portion, and in particular, to a method for surface treatment of a sliding portion, in which lubricativeness is given to the sliding portion of a tool, a die, a piston of an engine, a bearing, a shaft, and in addition hereto, an article including a portion (a sliding portion) sliding on another member as an object to be treated.

2. Description of the Prior Art

In many cases, fluid lubricant such as oil or grease is used in lubricating the sliding portion. However, responding to the case where the fluid lubricant cannot be used for reason of the design of the sliding portion, or the case where fluid and adsorptive air are evaporated and desorbed due to restrictions in the use environment, for example, like the case of use in vacuum, and further, and by the social demand for reducing as much as possible the use of fluid lubricant, accompanied by the recent trend of more sensitive reaction to environmental problems or the like, various solid lubricants have been proposed.

As one example of such solid lubricants, graphite(C), molybdenum disulfide ($MoS_2$), tungsten disulfide ($WS_2$), boron nitride (BN), or the like is used.

In addition, there is a method of forming a wear resistance layer on the sliding portion by use of the solid lubricant, by injecting particles of the solid lubricant onto the surface of the object to be treated at a predetermined injection pressure or speed or more to diffuse and penetrate elements in the solid lubricant composition into the surface thereof (refer to Japanese Patent KOKAI (LOPI) No. 11-131257).

In addition, there has been proposed a method in which solid lubricant powder and soft metal are mechanically contacted with each other for forming solid lubricant-containing soft metal powder, and a low-friction layer is formed by causing this solid lubricant-containing soft metal to contact with the surface of a metal member by use of mechanical means such as a shot blast, a barrel, and a ball mill (Japanese Patent KOKAI (LOPI) No. 2000-282259).

In a shot blast or shot peening of injecting the injection particles together with compressed air, when the compressed air is injected toward the object to be treated with an injection nozzle as shown in FIG. 1 (B), the compressed air which has collided with the surface of the object to be treated is reflected back by the object to be treated, thereby causing a layer made of the compressed air to be formed on the surface of the object to be treated, and together therewith the compressed air which has been interrupted in going straight to the object to be treated to change its flow into the direction along the surface of the object to be treated.

Therefore, in a case where the injection are smaller and lighter in relative relation to the injection pressure or the like of the compressed air, the injection particles get caught up in the flow of the compressed air, and the injection particles together with the compressed air are forced to change the flying direction thereof. As a result, the amount of injection particles colliding with the surface of the object to be treated is reduced. Further, collision energy of the injection particles is reduced due to the change in the flying direction as described above, or due to the layer of the compressed air formed on the surface of the object to be treated, and it becomes impossible to efficiently perform the diffusion/penetration of the injection particles into the object to be treated, and in turn, the formation of the wear resistance layer.

Therefore, as injection particles used in the shot blast or the shot peening, the injection particles having a particle size which enables the injection particles to effectively collide with the surface of the object to be treated is selected in light of the degree and purpose of working or in the relative relation to the working condition such as the injection pressure, and in the case where the injection particles once injected are used again, the fragmentized particles are removed out of the collected injection particles, thereby to make an adjustment so that their size is in a predetermined range.

By the way, graphite(C), molybdenum disulfide ($MoS_2$), tungsten disulfide ($WS_2$), or boron nitride (BN) exemplified as the solid lubricant is a layer-structure solid lubricant. In explanation of graphite as one example, graphite is of a hexagonal plate-crystal layered structure, wherein a carbon-carbon bond is formed on the surface of each layer constituting the layered structure by strong covalent bonding, whereas an inter-layer bond is formed by a relatively weak force. And the sliding occurs between the layers when a load is applied to the layered structure, which provides the lubricativeness.

Therefore, as shown in Japanese Patent KOKAI (LOPI) No. 11-131257, in the case of using the layered-structure solid lubricant as an injection particle, the impact at the time of colliding with the object to be treated incurs inter-layer peeling and causes the injection particles to be finely fragmentized so that many injection particles cannot be reused after one time-injection, which leads to an increase in a wear-out rate and hence in the cost of this kind of surface treatment.

As one example, when the layered-structure solid lubricant having an average particle diameter of 20 μm is injected onto the surface of the object to be treated as injection particles, the injection particles collected after the one-time injection have been fragmentized to pieces, each having an average particle diameter equal to or less than 10 μm. Even in the case of using any layered-structure solid lubricant as injection particles, it has been confirmed that when the injection particle is equal to or less than 5 μm in a diameter, an efficiency of the diffusion/penetration deteriorates, and when it is equal to or less than 1 μm in diameter, the efficiency thereof deteriorates extremely.

In addition, calculation of the expense of molybdenum disulfide required in the treatment based upon the wear-out rate of the injection particle in an attempt where a piston of an engine for an automobile is used as an object to be treated and the wear resistance layer is formed by use of molybdenum disulfide as an injection particle demonstrates that it is more costly by 100 yen or more per piston.

In a case where graphite, which is less expensive as compared with molybdenum disulfide, is used as an injection particle, the cost can be decreased to a low level. However, when graphite as carbon is fragmentized at the time of collision with the object to be treated to produce powder dust, there is a danger that powder dust fire or the like may possibly occurs. In addition, even when any one of the layered-structure solid lubricants is used, the powder dust produced due to the fragmentation pollutes and deteriorates the working environment.

In contrast, in the method described in Japanese Patent KOKAI (LOPI) No. 2000-282259 in which the solid lubricant-containing soft metal powder formed by mechanically contacting with the solid lubricant powder and the soft metal each other is used as injection particles, even in the case where the layered-structure solid lubricant is used as the solid lubricant powder, this solid lubricant powder is difficult to fragmentize because it is carried by the soft metal. Accordingly, it is thought that the problem with deterioration in the working environment caused by the powder dust is improved, as compared to the case of independently injecting the layered-structure solid lubricant.

However, according to the method described in Japanese Patent KOKAI (LOPI) No. 2000-282259 listed above, in order to obtain the injection particles, it is necessary that the solid lubricant powder and the soft metal are mechanically contacted with each other in advance to obtain the solid lubricant-containing soft metal powder, which is a complicated process.

Since the solid lubricant-containing soft metal powder obtained as described above is one obtained by carrying the solid lubricant powder on the particle surface of the soft metal, when the solid lubricant-containing soft metal powder is collided with the surface of the object to be treated, and the solid lubricant carried on the surface is adhered to the object to be treated, the amount of the solid lubricant equivalent to the one that has adhered to the object to be treated is lost from the surface of the solid lubricant-containing soft metal powder. Accordingly, using this repeatedly results in that the solid lubricant powder is transformed into one that cannot adhere to the object to be treated by a necessary amount.

Therefore, in the case of adopting the method described in Japanese Patent KOKAI (LOPI) No. 2000-282259, when the injection particle once injected is collected for reuse, unless the procedure is performed of causing the collected injection particles and the solid lubricant powder to mechanically contact with each other again, and of causing the solid lubricant powder to adhere to the surface of the soft metal, the layer with a stable quality cannot be formed.

Additionally, the layer formed with the solid lubricant or the like is used in place of the fluid lubricant such as oil or grease under the foregoing vacuum environment, but it is used under normal-pressure environment together with the fluid lubricant in many cases, and there are also many cases where it is provided for purpose of protecting the sliding portion from wearing in the event of the accidental loss of the oil layer in the sliding portion.

In the case of use of the layer with the fluid lubricant thus, it is preferable in a point of making generation of seizing etc. difficult all the more that minute concavities, which have the effect of an oil reservoir which makes it difficult that the oil layer loss occurs on the sliding portion of the object to be treated, are formed a lot.

However, in any method described above as the prior art, the concavity to achieve the effect of an oil reservoir like this cannot be formed simultaneously with the formation of the layer.

Thereupon, the present invention has been made for solving the problems in the above-mentioned prior art, and an object of the present invention is to provide a method for surface treatment of the sliding portion, which enables the surface treatment to be carried out economically for the sliding portion even in the case of using the layered-structure solid lubricant as an injection particle, the risk of pollution for the working environment, a powder dust fire, or the like is reduced, yet high lubricativeness is achieved, and moreover many concavities are formed on the sliding portion simultaneously with giving the lubricativeness.

SUMMARY OF THE INVENTION

In order to achieve the object, the method for surface treatment of the sliding portion according to the present invention includes the steps of injecting the injection particles obtained by blending the soft-metal solid lubricant particles of which the surface has been oxidized and the layered-structure solid lubricant particles onto the surface of the sliding portion at an injection speed of 150 m/sec or more, diffusing and penetrating an oxide of the soft-metal solid lubricant and the layered-structure solid lubricant into the surface of the sliding portion of the product to be treated to form the layer thereon, and forming many concavities, which are minute and substantially arc in cross section, on the surface of the sliding portion.

In the method for surface treatment of the sliding portion mentioned above, it is preferable that the concavity is formed to have an average diameter of 0.1 to 10 μm and an average depth of 0.1 to 5 μm.

In addition, the particle diameter of the solid lubricant particle is preferably in the range of 20 to 100 μm, and one having a particle diameter of 50 μm or so is used more preferably. In addition, the layered-structure solid lubricant particle having a particle diameter of 20 μm or less may be used, and even when fragmentized to a particle diameter of 5 μm or less, the layer can be stably formed by use of the fragmentized particle.

Further, the layered-structure solid lubricant particles comprising one or more of particles selected from a group of, for example, graphite(C), molybdenum disulfide ($MoS_2$), tungsten disulfide ($WS_2$), and boron nitride (BN) is blended with the soft-metal solid lubricant particles at a ratio of 5 to 30% by weight, preferably at a ratio of 10% or so by weight According to the arrangement of the present invention as described above, the method for surface treatment of the sliding portion of the present invention makes it possible to stably form the layer even in the case where the fragmentized layered-structure solid lubricant is used repeatedly as it is without removal thereof notwithstanding use of the layered-structure solid lubricant, which is easily fragmentized by collision with the object to be treated, as injection particles and to form many concavities functioning as an oil reservoir etc. on the surface of the sliding portion of the object to be treated at the same time with formation of the layer caused by the diffusion/penetration of the solid lubricant, and moreover to decrease the occurrence of the powder dust at the time of the treatment.

BRIEF DESCRIPTION OF THE DRAWINGS

The objects and advantages of the invention will become apparent from the following detailed description of preferred embodiments thereof provided in connection with the accompanying drawings in which:

FIGS. 1(A)-1(B) are explanatory views showing the relation between the flow of compressed air and the flying direction of the injection particles, wherein FIG. 1(A) shows the case where the soft-metal solid lubricant particles and the layered-structure solid lubricant particles are blended for injection, and FIG. 1(B) shows the case of independently injecting the layered-structure solid lubricant particles;

FIGS. 2(A)-2(C) are photomicrographs (×400) of a surface of an aluminum plate as an object to be treated, wherein FIG. 2(A) shows the case of an untreated aluminum plate, FIG. 2(B) shows the state after treatment of an embodiment 1-1 in which the method of the present invention is applied directly to the untreated aluminum plate, and FIG. 2(C) shows the state after treatment of an embodiment 1-2 in which the method of the present invention is applied after a blast treatment;

FIGS. 3(A)-3(C) are photomicrographs (×400) of a surface of a stainless plate as an object to be treated, wherein FIG. 3(A) shows the case of an untreated stainless plate, FIG. 3(B) shows the state after treatment of an embodiment 2-1 in which the method of the present invention is applied directly to the untreated stainless plate, and FIG. 3 (C) shows the state after treatment of an embodiment 2-2 in which the method of the present invention is applied after a blast treatment, FIGS. 4(A)-4(C) are photomicrographs (×400) of a surface of a titanium plate as an object to be treated, wherein FIG. 4(A) shows the case of an untreated titanium plate, FIG. 4(B) shows the state after treatment of an embodiment 3-1 in which the method of the present invention is applied directly to the untreated titanium plate, and FIG. 4(C) shows the state after treatment of an embodiment 3-2 in which the method of the present invention is applied after a blast treatment;

FIGS. 5(A)-5(B) are photomicrographs (×400) of a surface of an aluminum plate as an object to be treated, wherein FIG. 5(A) shows the case of an untreated aluminum plate, and FIG. 5(B) shows the state after treatment of the comparative example 1;

FIGS. 6(A)-6(B) are photomicrographs (×400) of a surface of a stainless plate as an object to be treated, wherein FIG. 6(A) shows the case of an untreated stainless plate, and FIG. 6(B) shows the state after treatment of the comparative example 2;

FIGS. 7(A)-7(B) are photomicrographs (×400) of a surface of a titanium plate as an object to be treated, wherein FIG. 7(A) shows the case of an untreated titanium plate, and FIG. 7(B) shows the state after treatment of the comparative example 3;

FIGS. 8(A)-8(C) are photomicrographs (×400) of a surface of a glass plate as an object to be treated, wherein FIG. 8(A) shows the case of an untreated glass plate, and FIG. 8(B) shows the state after treatment by the method of the present invention; and FIGS. 9(A)-9(B) are photomicrographs (×400) of a surface of a glass plate as an object to be treated, wherein FIG. 9(A) shows the case of an untreated glass plate, and FIG. 9(B) shows the state after injection of molybdenum disulfide alone.

DETAILED DESCRIPTION OF THE PREFERRED EMBODIMENTS

Figure 1:
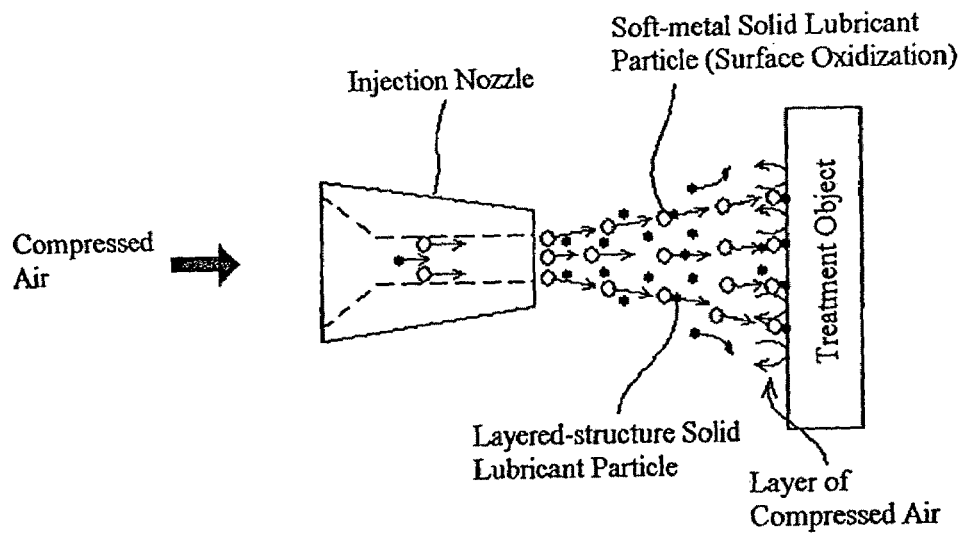
Figure 1:
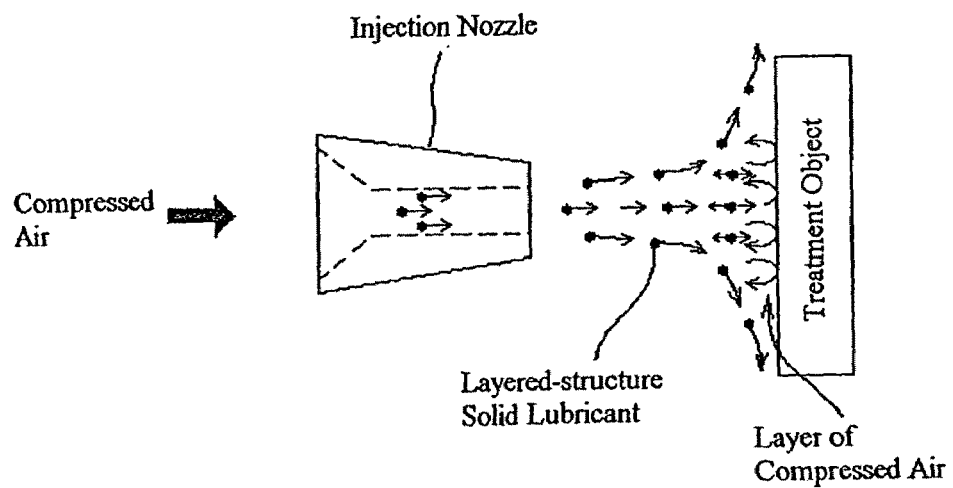

Next, embodiments of the present invention will be hereinafter explained.

Entire Arrangement

The method for surface treatment of the sliding portion according to the present invention includes the steps of injecting the injection particles obtained by blending the soft-metal solid lubricant particles of which the surfaces have been oxidized and the layered-structure solid lubricant particles onto the surface of the object to be treated at an injection speed of 150 m/sec or more, diffusing and penetrating an oxide of the soft-metal solid lubricant and the layered-structure solid lubricant into the surface of the object to be treated to form the layer thereon, and simultaneously therewith, forming numberless concavities, which are minute and substantially arc in cross section, on the sliding portion.

Note that the injection of the injection particles may be carried out after performing the blast treatment of the object to be treated. In this case, this blast treatment may be performed by injecting, for example, alumina having a particle diameter of 74 to 37 μm, silica beads, alundum (A), and carbon (C) (polygonal) at an injection pressure of 0.3 to 0.1 MPa, or at an injection speed of 150 to 50 m/sec.

When a material hardness of the sliding portion is high, it is difficult to form the concavities by the surface-oxidized soft metal. Especially with regard to the sliding portion having a material hardness exceeding HV600, forming the concavities in advance leads to reduction in work time.

Note that with regard to an abrasive material, a spherical abrasive material as a metal, a ceramic or a blended article thereof, or a polygonal abrasive material as a ceramic, A, white alundum (WA), C, or the like may be used and the particle diameter of both of the abrasive materials is preferably equal to or less than #220.

Treatment Object

As an object to be treated in the present invention, various articles having the portion (sliding portion), which slides on another member etc., can be treatment objects, and mechanical elements such as a piston of an engine, a bearing or a rotating shaft, a gear and a shaft, a cutting tool, and a die are exemplified as an object to be treated.

The method for the treatment of the present invention can be applied to a metal, ceramic or general blended article thereof as the material of the object to be treated. In addition, even in the case of use of glass as an object to be treated, the layer of the solid lubricant can be formed.

Injection Particle

The injection particles used in the method of the present invention is a blended one of the surface-oxidized soft metal solid lubricant particles and the layered-structure solid lubricant particles as mentioned above.

Soft-Metal Solid Lubricant Particle

The particles of tin (Sn) and zinc (Zn) can be used as a soft-metal solid lubricant particles, and this surface-oxidized soft-metal solid lubricant particles are used as injection particles together with the layered-structure solid lubricant to be described later.

Note that as the surface-oxidized soft-metal solid lubricant particles, besides the above, silver (Ag), indium (In), lead (Pb), etc. are thought to be used, but since silver (Ag) and indium (In) are expensive and lead (Pb) is harmful, they are not suitable for use.

Oxidization of the surface of the soft-metal solid lubricant particles may be performed with any method, and in this embodiment, the surface of the soft-metal solid lubricant particles is oxidized with a liquid atomization method.

The soft-metal solid lubricant particle of which the surface has been oxidized thus is relatively soft because the oxidized surface portion is high in hardness and the inside is of the soft metal that has not been oxidized.

The particle diameter of the soft-metal solid lubricant particle to be used is in the range of 20 to 100 μm, and one having a particle diameter of 50 μm or so is used preferably.

Layered-Structure Solid Lubricant Particle

As a layered-structure solid lubricant particle, the layered structure of graphite(C), molybdenum disulfide ($MoS_2$), tungsten disulfide ($WS_2$), boron nitride (BN), phthalocyanine or the like is used.

The layered-structure solid lubricant particle having a particle diameter of 20 μm or less may be used, and even when fragmentized to a particle diameter of 5 μm or less, the fragmentized particle may be used as it is by collecting the injected injection particle and using it repeatedly.

Blending Ratio

With regard to a blending ratio of the surface-oxidized soft-metal solid lubricant particles to the layered-structure solid lubricant particles, the layered-structure solid lubricant grain of 5 to 30% by weight, preferably 10% or so by weight is blended with the surface-oxidized soft-metal solid lubricant particles, which are used as the injection particles.

Operation

When the injection particles obtained as described above are injected onto the sliding portion of the object to be treated at an injection speed of 150 m/sec or more, both surfaces of the object to be treated and the injection particles have heat energy generated, in consideration of the law of conservation of energy based upon the speed change between before and after the collision of the injected injection particles with the sliding portion of the object to be treated.

Since the conversion of energy is performed only at deformed portions with which the injection particles have collided, temperature rises locally in the injection particles and in the vicinity of the surface of the sliding portion of the object to be treated.

Since this temperature rise is in proportion to the speed prior to the collision of the injection particles, making the injection speed of the injection particles high makes it possible to increase the temperature of the injection particles and the surface of the sliding portion of the object to be treated.

Accordingly, it is thought that the oxide formed on the surface of the soft-metal solid lubricant constituting the injection particles and the layered-structure solid lubricant particles are heated due to colliding with the sliding portion of the object to be treated, the injection particles are activated and adsorbed into the surface of the sliding portion of the object to be treated, whereby they diffuse/penetrate. As a result, a layer made of the oxide of the soft-metal solid lubricant and the layered-structure solid lubricant is formed on the surface of the sliding portion of the object to be treated.

The oxide formed on the surface of the soft-metal solid lubricant particles are activated and adsorbed into the sliding portion of the object to be treated due to the foregoing collision, and diffuse and penetrate, and the oxide on the surface of the soft-metal solid lubricant particles partly disappear due to activation and adsorption by the sliding portion of the object to be treated, but since the portion where the surface oxide has disappeared is instantaneously oxidized due to the heat at the collision time, the soft-metal solid lubricant particles maintain the state where the surface has been oxidized without re-oxidization with the water atomized method or the like.

In addition, since the oxidized surface of the soft-metal solid lubricant particle has a hardness of HV 1000 or more due to the oxidization, many concavities, which is substantially arc in cross section, are formed on the sliding portion of the object to be treated, and also, compressive residual stress is provided on the surface of the sliding portion.

The oxidized surface of the soft-metal solid lubricant particle shows a high hardness as described above, but the inside thereof is of the soft metal which has not been oxidized. Therefore, the soft metal in the inside serves as a cushion and the formed concavities are relatively shallow, which makes it difficult that the sliding portion of the object to be treated will be surface-roughed.

Each of the concavities thus formed, which has a diameter of substantially 0.1 to 10 µm and a depth of 0.1 to 5 µm or so, has an idealistic shape as an oil reservoir.

When the injection particles are thus injected onto the object to be treated, the layered-structure solid lubricant particles in the injection particle are relatively easily fragmentized due to impact at the time of the collision and the particle diameter is reduced.

Therefore, as explained with reference to FIG. 1(B), in the case of injecting only the layered-structure solid lubricant particles independently, reduction in the particle diameter caused by this fragmentation allows the amount of the layered-structure solid lubricant particles colliding with the sliding portion of the object to be treated to be reduced, or energy at the time of the collision to be reduced, thereby making the diffusion/penetration of the particle into the sliding portion difficult together with reduction in the particle diameter.

However, in the case of injecting the layered-structure solid lubricant particles together with the soft-metal solid lubricant particles having a particle diameter of 20 to 100 µm, preferably 50 µm or so, it is possible to stably perform the diffusion/penetration of the layered-structure solid lubricant into the sliding portion of the object to be treated regardless of reduction in the particle diameter of the layered-structure solid lubricant particle.

It is considered that the diffusion/penetration into the sliding portion of the object to be treated can be stably performed in such a manner although the particle diameter of the layered-structure solid lubricant particle is reduced, and the layered-structure solid lubricant particle, which has been fragmented and has reduced in the particle diameter, is pushed by the soft-metal solid lubricant particle, which is difficult to fragmentize and maintains the initial particle diameter, to reach the surface of the sliding portion of the object to be treated where the stable diffusion and penetration are performed (refer to FIG. 1(A)).

As a result, even in the case where the layered-structure solid lubricant particle of which the initial particle diameter was 20 µm or so is fragmentized to have a particle diameter of 5 µm or less, it is possible to stably perform the formation of the layer, and even in the case of collecting the injection particle, which was used once, and of which the layered-structure solid lubricant particle was fragmentized, and of using it repeatedly, it is possible to stably perform the formation of the layer, which enables the surface treatment of the present invention to be economically performed.

Embodiments

Next, embodiments of the method for surface treatment of the sliding portion will be explained using comparative examples.

Surface Treatment Test

An aluminum plate, a stainless plate, and a titanium plate are respectively prepared as an object to be treated and the results obtained by performing the surface treatment to each treatment object are shown below.

1. Embodiment 1, Comparative Example 1

Treatment object; aluminum plate (50×50×1 mm)

Embodiment 1 (Embodiment 1-1, Embodiment 1-2); the tin particles of 2 kg the surfaces of which were oxidized with the water atomized method and the molybdenum disulfide particles of 200 g were blended, which were injected onto the aluminum plate (50×50×1 mm) as an injection particle at conditions shown in Table 1.

Note that as Embodiment 1, the above-mentioned injection particles were injected directly onto the untreated aluminum plate (Embodiment 1-1) and also the injection particles were injected onto the aluminum plate for which the blast treatment was performed by injecting spherical alumina and silica beads having a particle diameter of 55 µm at an injection pressure of 0.2 MPa as a pre-treatment (Embodiment 1-2).

Comparative example 1; only the molybdenum disulfide particles were injected as the injection particles onto the aluminum plate (50×50×1 mm) at conditions shown in Table 1.

TABLE 1

Treatment conditions and treatment results of Embodiment 1 and Comparative example 1

| | Embodiment 1 (1-1, 1-2) | Comparative example 1 |
|---|---|---|
| Injection pressure | Fine powder type 0.6 Mpa | Fine powder type 0.6 Mpa |
| Injection time | 100 mm | 100 mm |
| Injection time | 15 sec | 15 sec |
| Injection nozzle diameter | Diameter 9 mm | Diameter 9 mm |
| Surface-oxidized metal particle | Tin (water atomized) 50 μm | |
| Solid lubricant particle Treatment conditions | $MoS_2$ 5 μm or less | $MoS_2$ 20 μm |
| Working atmosphere | Possible to confirm treatment object visually | Product to be treated cannot be seen at all due to powder dust |
| Condition of surface | Concavity exists on surface. Layer adheres to surface thinly and equally. | Layer adheres to surface thickly. |
| Use amount (consumption amount) of $MoS_2$ | Average 0.8 g per one plate | Average 2.0 g per one plate |

2. Embodiment 2, Comparative Example 2

Treatment object; stainless plate (50×50×1 mm)

Embodiment 2 (Embodiment 2-1, Embodiment 2-2); the zinc particles of 2 kg the surfaces of which were oxidized with the water atomized method and the molybdenum disulfide particles of 200 g were blended, which were injected onto the stainless plate (50×50×1 mm) as the injection particles at conditions shown in Table 2.

Note that as Embodiment 2, the injection particles were injected directly onto the untreated stainless plate (Embodiment 2-1) and also the injection particles were injected onto the stainless plate for which the blast treatment was performed by injecting spherical alumina and silica beads having a particle diameter of 55 μm at an injection pressure of 0.3 MPa as a pre-treatment (Embodiment 2-2).

Comparative example 2; only the molybdenum disulfide particles were injected as the injection particles onto the stainless plate (50×50×1 mm) at conditions shown in Table 2.

TABLE 2

Treatment Conditions and treatment results of Embodiment 2 and Comparative example 2

| | Embodiment 2 (2-1, 2-2) | Comparative example 2 |
|---|---|---|
| Injection pressure | Fine powder type 0.6 Mpa | Fine powder type 0.6 Mpa |
| Injection distance | 100 mm | 100 mm |
| Injection time | 15 sec | 15 sec |
| Injection nozzle diameter | Diameter 9 mm | Diameter 9 mm |
| Surface-oxidized metal particle | Zinc (water atomized) 50 μm | |
| Solid lubricant particle Treatment conditions | $MoS_2$ 5 μm or less | $MoS_2$ 20 μm |
| Working atmosphere | Possible to confirm treatment object visually | Product to be treated cannot be seen at all due to mine dusts |
| Condition of surface | Concavity exists on surface. Layer adheres to surface thinly and equally. | Layer adheres to surface thickly. Difficult for layer to adhere to surface. |
| Use amount (consumption amount) of $MoS_2$ | Average 1.0 g per one plate | Average 2.5 g per one plate |

3. Embodiment 3, Comparative Example 3

Treatment object; titanium plate (50×50×1 mm)

Embodiment 3 (Embodiment 3-1, Embodiment 3-2); the tin particles of 2 kg the surfaces of which were oxidized with the water atomized method and the molybdenum disulfide particles of 200 g were blended, which were injected onto the titanium plate (50×50×1 mm) as the injection particles at conditions shown in Table 3.

Note that as Embodiment 3, the injection particles were injected directly onto the untreated titanium plate (Embodiment 3-1) and also the injection particles were injected onto the titanium plate for which the blast treatment was performed by injecting spherical alumina and silica beads having a particle diameter of 55 μm at an injection pressure of 0.3 MPa as a pre-treatment (Embodiment 3-2).

Comparative example 3; only the molybdenum disulfide particles were injected as an injection particle onto the titanium plate (50×50×1 mm) at conditions shown in Table 3.

TABLE 3

Treatment conditions and treatment results of Embodiment 3 and Comparative example 3

| | Embodiment 3 (3-1, 3-2) | Comparative example 3 |
|---|---|---|
| Injection pressure | Fine powder type 0.6 Mpa | Fine powder type 0.6 Mpa |
| Injection distance | 100 mm | 50 mm* |
| Injection time | 15 sec | 15 sec |
| Injection nozzle diameter | Diameter 9 mm | Diameter 9 mm |
| Surface-oxidized metal particle | Tin (water atomized) 50 μm | |
| Solid lubricant particle Treatment conditions | $MoS_2$ 5 μm or less | $MoS_2$ 20 μm |
| Working atmosphere | Possible to confirm treatment object visually | Product to be treated cannot be seen at all by powder dusts |
| Condition of surface | Concavity exists on surface. Layer adheres to surface thinly and equally. | Layer adheres to surface thickly. Difficult for layer to adhere to surface. |
| Use amount (consumption amount) of $MoS_2$ | Average 1.0 g per one plate | Average 3.0 g per one plate |

*Since it was difficult for the injection particle to adhere to the surface, the injection distance was set as 50 mm.

As a result of the above, the surface treatment of each of Embodiments 1 to 3 enabled the consumption amount of molybdenum disulfide ($MoS_2$) to be reduced as compared to that of Comparative examples 1 to 3 and, in details, enabled the consumption amount to be reduced in the aluminum plate and stainless plate each by 60%, and in the titanium plate by 67%, respectively.

Figure 2:
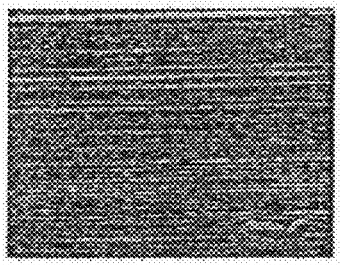
Figure 2:
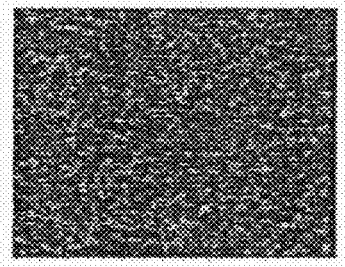
Figure 2:
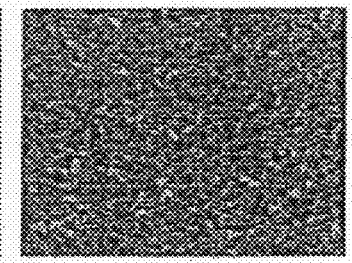
Figure 3:
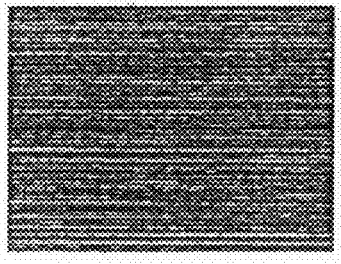
Figure 3:
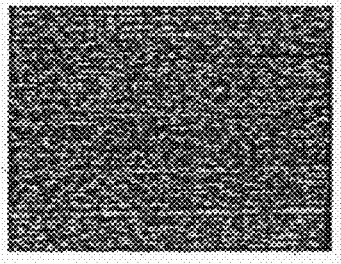
Figure 3:
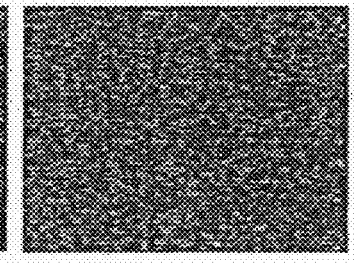
Figure 4:
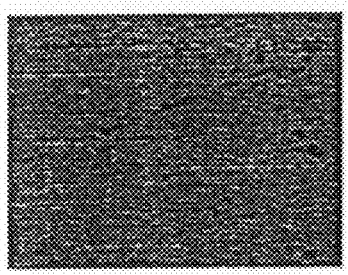
Figure 4:
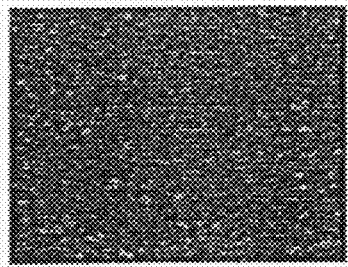
Figure 4:
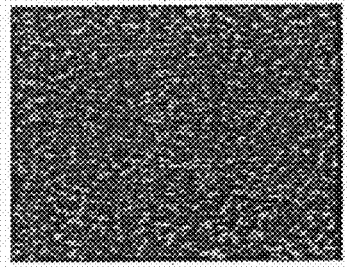

In addition, it was confirmed that the concavity was formed on the surface of the object to be treated in Embodiments 1 to 3 (refer to FIGS. 2 to 4).

Figure 5:
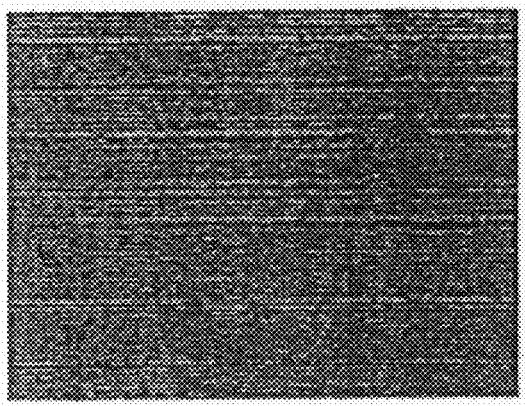
Figure 5:
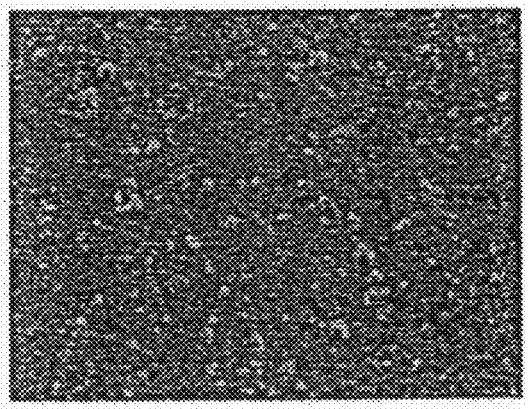
Figure 6:
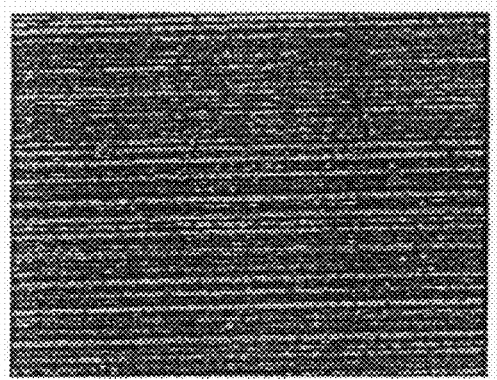
Figure 6:
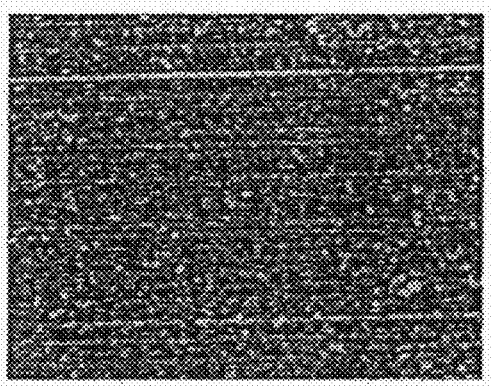
Figure 7:
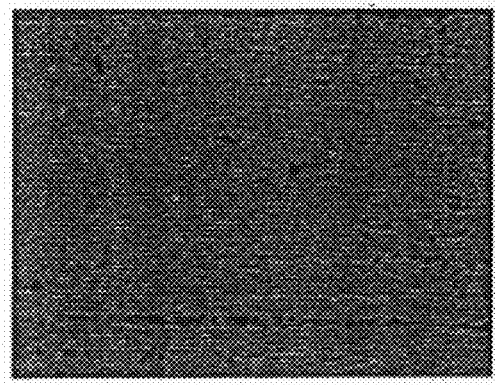
Figure 7:
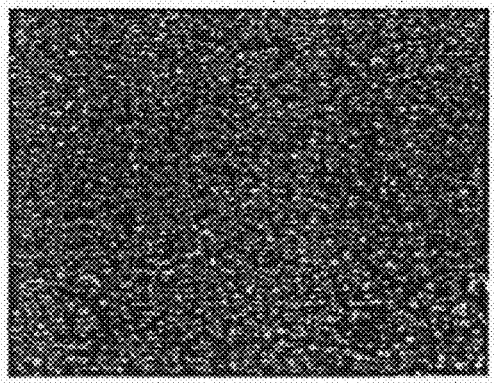

In contrast, although it was confirmed that in Comparative examples 1 to 3 where only the molybdenum disulfide ($MoS_2$) particles were injected, the molybdenum disulfide adhered to the surface of the object to be treated, the adherence amount was great so that a dimensional accuracy of the product to be treated might be impaired, and although the surface of treatment object became rugged, the concavity suitable for an oil reservoir was not formed because this ruggedness was produced due to uneven adherence of the molybdenum disulfide (refer to FIGS. 5 to 7).

Further, in Embodiments 1 to 3, an improvement in the compressive stress on the surface was confirmed, and an increase in the hardness also was confirmed such that that the hardness of the aluminum plate was increased by HV100 or so, and that of the stainless plate and the titanium plate was increased by HV100 or more, respectively.

Note that in Comparative examples, the higher the hardness of the object to be treated was, the more difficult it was to form the layer, and in Comparative example 3 of using the titanium plate as an object to be treated, the injection distance had to be set close to 50 mm which was half of that in Embodiment because it was difficult to form the layer at the same conditions as that of the Embodiment. On the other hand, in the surface treatment of each of Embodiments 1 to 3, it was possible to stably form any layer at the same conditions despite the material of the object to be treated.

4. Others

In addition, according to the method of the surface treatment of the present invention, the layer of the solid lubricant can be formed on not only the foregoing metal materials but also ceramics or glass.

Figure 8:
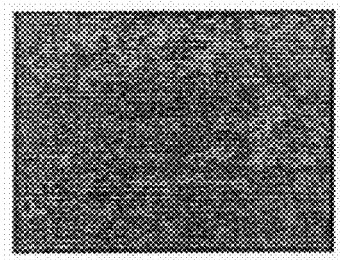
Figure 8:
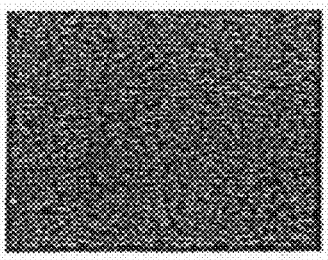
Figure 8:
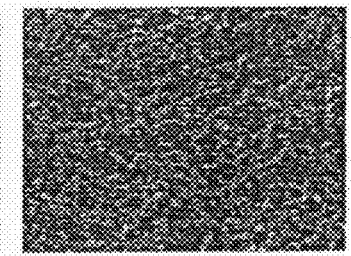

When, as one example, the surface treatment was performed to the glass plate as an object to be treated at the same conditions as that of the Embodiment 1, it was confirmed that it was possible to form a layer of the solid lubricant on the surface of the glass as well (refer to FIG. 8).

Figure 9:
Figure 9:
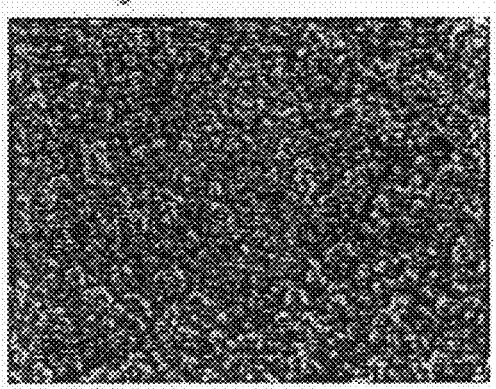

On the other hand, also in the case of injecting the molybdenum disulfide particles onto the glass plate as an object to be treated likewise, it was found out that it was possible that the solid lubricant was adhered to the surface of the glass plate, but the adherence was thick and rough (refer to FIG. 9).

Endurance Test

The product of the embodiment treated with the method of the surface treatment of the present invention and the product of the comparative example treated by using only the layered-structure solid lubricant particle as an injection particle were compared in terms of durability (life time). The result is shown below.

1. Embodiment 4, Comparative Example 4 (Lifetime Measurement of Fine-Blanking Punch)

The endurance test result of the fine-blanking punch (Embodiment 4) surface-treated with the method of the present invention and the fine-blanking punch (Comparative example 4) surface-treated by injecting only the layered-structure solid lubricant particles is shown in Table 4.

Note that the work conditions in Embodiment 4 and Comparative example 4 are as shown in Table 4, and the treatment conditions not shown in Table 4 are the same as that of Table 1.

In addition, the injection pressure was increased to 0.7 MPa in Comparative example 4 because the diffusion/penetration amount of the solid lubricant is reduced when the injection pressure is set to the same amount as that of Embodiment 4.

TABLE 4

|  | Embodiment 4 | Comparative example 4 |
| --- | --- | --- |
| Treatment time | Approximately 1.5 min | Approximately 1.5 min at a pressure of 0.7 Mpa |
| Use amount of $MoS_2$ (consumption amount) | 2.0 g | 10.0 g |
| Average lifetime of die | 405,000 pieces | 135,000 pieces |
| Treatment object | Fine-blanking punch (Working a high tensile steel sheet SANH60) Average lifetime of untreated one (27,000 pieces) Material: YXR 3 Surface treatment: TiCN | |
| Work material | High tensile steel sheet SANH60 (thickness: 2.0 mm) | |

As a result of the above, it was confirmed that a lifetime of the fine-blanking punch in Embodiment 4 was three times that of the fine-blanking punch in Comparative example 4. Moreover, in comparison to the untreated fine-blanking punch, it was confirmed that the lifetime was 15 times and the method of the surface treatment of the present invention allowed the friction resistance to be largely reduced.

2. Embodiment 5, Comparative Example 5 (Lifetime Measurement of Trimming Punch)

The endurance test result of the trimming punch (Embodiment 5) surface-treated with the method of the present invention and the trimming punch (Comparative example 5) surface-treated by injecting only the layered-structure solid lubricant particles is shown in Table 5.

Note that the work conditions in Embodiment 5 and Comparative example 5 are as shown in Table 5, and the treatment conditions not shown in Table 5 are the same as that of Table 1.

In addition, the injection pressure was increased to 0.7 MPa in Comparative example 5 because the diffusion/penetration amount of the solid lubricant is reduced when the injection pressure is set to the same amount as that of Embodiment 5.

TABLE 5

|  | Embodiment 5 | Comparative example 5 |
| --- | --- | --- |
| Treatment time | Approximately 15 sec | Approximately 15 sec at a pressure of 0.7 Mpa |
| Use amount of $MoS_2$ | 1.0 g | 4.0 g |
| Average lifetime of die | 175,000 pieces | 125,000 pieces |
| Treatment object | Trimming punch Average lifetime of the untreated one (25,000 pieces) Material: SKH51 Surface treatment: TiN Size 15 × 15 × 75 L (mm) | |
| Work material | SUS 301 (thickness: 0.31 mm) | |

As a result of the above, it was confirmed that the lifetime of the trimming punch in Embodiment 5 was 1.4 times that of the trimming punch in Comparative example 5. Moreover, in comparison to the untreated trimming punch, it was confirmed that the lifetime was seven times and the method of surface treatment of the present invention allowed the friction resistance to be largely reduced.

3. Embodiment 6, Comparative Example 6 (Lifetime Measurement of Drawing Die)

The endurance test result of the drawing die (Embodiment 6) surface-treated by the method of the present invention and the drawing die (Comparative example 6) surface-treated by injecting only the layered-structure solid lubricant particles is shown in Table 6.

Note that the work conditions in Embodiment 6 and Comparative example 6 are as shown in Table 6, and the treatment conditions not shown in Table 6 are the same as that of Table 1.

In addition, the injection pressure was increased to 0.9 MPa in Comparative example 6 because the diffusion/penetration amount of the solid lubricant is reduced when the injection pressure is set to the same amount as that of Embodiment 6.

TABLE 6

|  | Embodiment 6 | Comparative example 6 |
|---|---|---|
| Treatment time | Approximately 2 min only for inner diameter of φ50 | Approximately 2 min at pressure of 0.9 Mpa |
| Use amount of MoS$_2$ | 3.0 g | 15.0 g |
| Average lifetime of die | 560,000 pieces | 210,000 pieces |
| Treatment object |  | Drawing die |
|  | Average lifetime of untreated one (70,000 pieces) | |
|  | Material: YXR 3 | |
|  | Surface treatment: TiCN | |
|  | Size: outer diameter 150 × inner diameter 50 × 100 L (mm) | |
| Work material | High tensile steel sheet SANH60P (thickness: 5.0 mm) | |

As a result of the above, it was confirmed that the lifetime of the drawing die in Embodiment 6 was 2.7 times that of the drawing die in Comparative example 6. Moreover, in comparison to the untreated drawing die, it was confirmed that the lifetime was eight times and the method of surface treatment of the present invention allowed the friction resistance to be largely reduced.

As accompanied by the weight saving of automobiles in recent years, the steel sheet to be used has become thin in thickness, and the high tensile steel sheet has been used for strength guarantee. However, the situation is that tools for working these steel sheets have not been improved in terms of strength in response thereto, and many problems have occurred caused by the reduction in lifetime or the like.

It was confirmed that also in the test for the drawing die used under such harsh conditions, the die surface-treated with the method of the present invention improved remarkably in lifetime and was able to respond to the foregoing demand in the market.

Review

From the above test result, the method of the surface treatment of the present invention enables countless concavities to be formed in good working conditions and yet simultaneously while compensating for the defect of high fragmentation rate in the case of independently using the layered-structure solid lubricant particles.

In addition, from the test result, the lubricating effect can be obtained in the die etc. operating under the harsh condition such as the high surface pressure, and for this reason, it is thought that the effect of remarkable lifetime extension is obtained due to a synergy effect of the oxide of the soft-metal solid lubricant and the layered-structure solid lubricant.

It will thus be seen that the objects set forth above, and those made apparent from the foregoing description, are efficiently attained. Also, since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method for surface treatment of a sliding portion, comprising the steps of:

injecting injection particles, obtained by blending metal solid lubricant particles having oxidized surfaces to increase their surface hardness and layered-structure solid lubricant particles, at an injection speed of 150 m/sec or more onto a surface of a sliding portion of a product to be treated, said injecting step forming concavities on the surface of the sliding portion, the concavities having an average diameter of 0.1 to 10 μm and an average depth of 0.1 to 5 μm and substantially arched in cross section, on the surface of the sliding portion, said oxidized surfaces being obtained by a water atomization method; and diffusing and penetrating the surface of the sliding portion with the injection particles to form a layer of the injection particles on the surface of the sliding portion.

2. The method for surface treatment of the sliding portion according to claim 1, wherein a particle diameter of the metal solid lubricant particles is in the range of 20 to 100 μm; and the layered-structure solid lubricant particles have a particle diameter of 20 μm or less.

3. The method for surface treatment of the sliding portion according to claim 1, wherein the layered-structure solid lubricant particles are 5 to 30% by weight.

4. The method for surface treatment of the sliding portion according to claim 2, wherein the layered-structure solid lubricant particles are 5 to 30% by weight.

5. The method for surface treatment of the sliding portion according to claim 1, wherein the layered-structure solid lubricant particles are formed from one or a plurality of particles selected from the group consisting of graphite (C), molybdenum disulfide (MoS2), tungsten disulfide (WS2), and boron nitride (BN).

6. The method for surface treatment of the sliding portion according to claim 2, wherein the layered-structure solid lubricant particles are formed from one or a plurality of particles selected from the group consisting of graphite (C), molybdenum disulfide (MoS2), tungsten disulfide (WS2), and boron nitride (BN).

7. The method for surface treatment of the sliding portion according to claim 3, wherein the layered-structure solid lubricant particles are formed from one or a plurality of particles selected from the group consisting of graphite (C), molybdenum disulfide (MoS2), tungsten disulfide (WS2), and boron nitride (BN).

8. The method for surface treatment of the sliding portion according to claim 4, wherein the layered-structure solid lubricant particles are formed from one or a plurality of particles selected from the group consisting of graphite (C), molybdenum disulfide (MoS2), tungsten disulfide (WS2), and boron nitride (BN).

9. The method for surface treatment of the sliding portion according to claim 1, wherein the metal solid lubricant particles are formed from tin (Sn) or zinc (Zn).

10. The method for surface treatment of the sliding portion according to claim 2, wherein the metal solid lubricant particles are formed from tin (Sn) or zinc (Zn).

11. The method for surface treatment of the sliding portion according to claim 3, wherein the metal solid lubricant particles are formed from tin (Sn) or zinc (Zn).

12. The method for surface treatment of the sliding portion according to claim 4, wherein the metal solid lubricant particles are formed from tin (Sn) or zinc (Zn).

* * * * *